3,050,474
EPOXIDE RESIN COMPOSITIONS
Donald H. Russell, Pennsauken, N.J., assignor to The Atlantic Refining Company, Philadelphia, Pa., a corporation of Pennsylvania
No Drawing. Filed Dec. 10, 1959, Ser. No. 858,607
11 Claims. (Cl. 260—2)

This invention relates to novel epoxide resin compositions, particularly to epoxide resin compositions having improved physical properties and to a method for their preparation.

Epoxide resins per se are well-known in the prior art. Epoxide resins are sometimes called epoxy or ethoxyline resins. Generally they comprise a polyether derivative of a polyhydroxy organic compound such as a polyhydroxy alcohol or polyhydroxy phenol. For example, U.S. Patent No. 2,324,483 discloses epoxide resin compositions prepared by reacting a phenol containing at least two hydroxy groups with an epihalohydrin such as epichlorohydrin to produce a product having at least two epoxy groups and which can be cured to a thermoset and fusible mass by the use of a suitable curing agent, such as carboxylic or polybasic acids or acid anhydrides. Other materials which have been used to cure epoxide resins include organic amines as disclosed in U.S. Patent No. 2,444,333. Typically, the epoxide resins cured with any of the foregoing types of curing agents are hard and somewhat brittle. In many applications, the hard and brittle epoxide resins are very useful, however, it is sometimes desirable that epoxide resins used as adhesive fillers, impregnants, coatings, and the like in conjunction with other structures such as wires, laminates, etc. be rubbery or flexible at ambient and higher temperatures to prevent temperature induced forces from rupturing the structure. In addition, it is also always desirable that any cured epoxide resin exhibit as great a tensile strength as possible.

A material now has been found which when added to an uncured epoxide resin composition and the entire mass subsequently cured, will enable the selective production of epoxide resins having greatly improved tensile strengths and/or improved flexibility characteristics.

It is, therefore, an object of this invention to provide novel epoxide resin compositions.

It is another object of this invention to provide novel epoxide resin compositions having improved physical properties.

Other objects of this invention will be apparent from the description and claims which follow.

In accordance with this invention, novel epoxide resin compositions having improved physical properties may be prepared by incorporating into an uncured epoxide resin a conventional curing agent and a hydroxymethyl-dialkyl-meta-dioxane and subsequently curing the entire mass.

The hydroxymethyl-dialkyl-meta-dioxanes used in this invention may be suitably prepared by condensing the appropriate olefin with the appropriate aldehyde, in accordance with the well-known Prins reaction. For example, hydroxymethyl-dimethyl-meta-dioxanes are obtained as by-products in the condensation of a $C_4$ olefin with formaldehyde or paraformaldehyde in the presence of sulfuric acid as a catalyst. (See for example "Dual Reactivity in the Reaction of Olefins With Aldehydes," by M. I. Farberov, Doklady Akad. Nauk SSSR, vol. 110, pp. 1005–1008, 1956.)

It is known in the art that meta-dioxanes may be produced by reacting an olefin hydrocarbon with an aldehyde in the presence of an acid catalyst. The type of compound produced depends upon the olefin, aldehyde and catalyst used as well as on the reaction temperature. Although various acidic catalysts, such as mineral acids, phosphotungstic acid and zinc chloride may be used, it is generally preferred to utilize sulfuric acid as the catalyst. Concentrations of this acid may vary from 2 to 85 weight percent depending on the type of olefin feed, and reaction temperatures may range from 5° to 150° C. and higher. Thus, isobutylene may be reacted with formaldehyde or substances yielding formaldehyde, such as paraformaldehyde, at temperatures ranging preferably from 40° C. to 70° C. in the presence of an aqueous sulfuric acid catalyst of about 10 to 40 weight percent concentration, preferably about 25 weight percent concentration, to form 4,4-dimethyl-meta-dioxane. Butene-2 may be similarly reacted with formaldehyde or paraformaldehyde, in the presence of a sulfuric acid catalyst of about 40 to 60 weight percent concentration to form 4,5-dimethyl-meta-dioxane.

It is also known that a normally gaseous hydrocarbon stream obtained from either catalytic cracking or thermal cracking of hydrocarbons or a mixture of such streams and containing a mixture of $C_4$ paraffins and olefins, including isobutylene and butene-2, as well as some $C_3$ and $C_5$ paraffins and olefins, will react with formaldehyde or substances yielding formaldehyde at temperatures ranging preferably from 40° C. to 70° C. in the presence of an aqueous sulfuric acid catalyst to form 4,4-dimethyl-meta-dioxane and 4,5-dimethyl-meta-dioxane. If it is desired to react predominantly the isobutylene in such a stream relatively dilute concentrations of sulfuric acid catalyst, preferably about 25 weight percent, are used in which case 4,4-dimethyl-meta-dioxane will be produced predominantly along with a small amount of 4,5-dimethyl-meta-dioxane from the reaction of butene-2. As the acid concentration is increased, the conversion of butene-2 increases, with acid concentrations of greater than about 40 weight percent resulting in essentially complete conversion of butene-2. A typical analysis of such a normally gaseous hydrocarbon stream resulting from both catalytic cracking and thermal cracking operations follows (in percent by weight):

| | |
|---|---|
| Propene | 1.0 |
| Propane | 0.5 |
| Isobutylene | 13 |
| Butene-2 | 21 |
| Butene-1 | 11 |
| Isobutane | 38 |
| n-Butane | 14 |
| Pentene | 0.4 |
| Isopentane | 1.1 |

The crude product resulting from the reaction of either isobutylene or butene-2 or both with formaldehyde contains, along with the primary products consisting of 4,4-dimethyl-meta-dioxane, and 4,5-dimethyl-meta-dioxane various by-products resulting from these reactions along with some unreacted materials. Among the by-products are found hydroxymethyl-dimethyl-meta-dioxanes. Thus, in the production of 4,4-dimethyl-meta-dioxane from the reaction of isobutylene with formaldehyde there is also formed 5 - hydroxymethyl - 4,4-dimethyl-meta-dioxane. Similarly, in the reaction of butene-2 with formaldehyde, there is also formed 4-hydroxymethyl-4,5-dimethyl-meta-dioxane or 5-hydroxymethyl-4,5-dimethyl-meta-dioxane, or both. In the reaction of both isobutylene and butene-2 with formaldehyde all three position isomers will be formed.

Upon vacuum fractional distillation of the products resulting from the condensation of isobutylene and formaldehyde in the presence of dilute sulfuric acid, that material boiling from about 78° C. to about 124° C. at 10 mm. of mercury pressure was found upon analysis to be predominantly hydroxy-methyl-dimethyl-meta-dioxane. This material had a +12 Sayboldt color, a viscosity of 167.5 SUS at 77° F. and a specific gravity of 1.10 at 77° F.

The epoxide resins used in this invention are, as stated above, well-known in the prior art. They are described thoroughly in both the patented art and the published literature. For example, they are described in United States Patent Nos. 2,324,483 and 2,444,333 and British Patents Nos. 518,057 and 579,698. Generally the epoxide resins described in these patents comprise the reaction products of an epihalohydrin, such as epichlorohydrin, and a phenol having at least two phenolic hydroxy groups such as bis(4-hydroxyphenyl)-2,2-propane (Bisphenol A). The epoxide resins used in this invention have more than one epoxy group per molecule. They may be prepared by reacting a polyhydroxy alcohol or a polyhydroxy phenol such as hydroquinone, resorcinol, glycerine, or condensation products of phenols with ketones such as Bisphenol A with an epihalohydrin such as epichlorohydrin. For example, the reaction between Bisphenol A and epichlorohydrin is as follows:

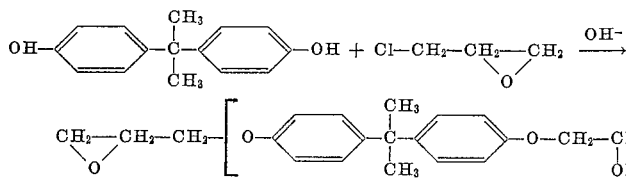

where $n$ has an average value ranging from 0 to about 10. Epoxide resins of this type are sold under the names Epon, Araldite, ERL resins and Epi-Rez resins. Typical physical properties of such resins are shown in Table I below.

TABLE I

| Epoxide resin | Epoxy equiv. | Ave. mol. weight |
| --- | --- | --- |
| Epon 820 | 175-210 | 350-400 |
| Epon 828 | 175-210 | 250-400 |
| Epon 834 | 225-290 | 450 |
| Araldite 6010 | 195 | |
| Araldite 6020 | 210 | |
| ERL 2774 | 185-200 | 350-400 |
| Epi-Rez 510 | 180-200 | 350-400 |

All of the epoxide resins noted in Table I are prepared by reacting Bisphenol A with epichlorohydrin. Additional information concerning these types of resins may be found in Lee and Neville, Epoxy Resins, McGraw-Hill Book Company, Inc., New York, 1957.

The curing agents which may be used in this invention are those which are well-known and conventionally used in epoxide resin technology. For example, primary aliphatic amines and their adducts, secondary aliphatic amines, cyclic aliphatic amines, tertiary amines, aromatic amines, liquid polyamide resins containing free amines or amine decomposition products, organic dibasic and polybasic acids, and acid anhydrides may be used in this invention. Examples of specific curing agents which may be used in the preparation of the novel epoxide resin compositions of this invention include diethylenetriamine, liquid polyamide resins, such as condensation products of polymeric fatty acids and aliphatic polyamines known commercially as Versamids, dodecylbenzene diamine and phthalic anhydride.

As stated above, by adding the proper amount of a hydroxymethyl-dialkyl-meta-dioxane to a mixture of an uncured epoxide resin and a conventional curing agent and subsequently curing the resulting mixture, there will be produced a novel epoxide resin composition having improved and unexpected physical properties. Generally, it has been found that as amounts up to about 10 to less than 15 parts by weight per 100 parts by weight of uncured epoxide resin of a hydroxymethyl-dialkyl-meta-dioxane, such as a hydroxymethyl-dimethyl-meta-dioxane, are added to mixtures of an uncured epoxide resin and a conventional curing agent, and the resulting mixtures cured, the tensile strength of the cured epoxide resin composition will increase as much as 100 percent or greater and in certain instances the flexibility as related to elongation will also increase. If amounts of hydroxymethyl-dimethyl-meta-dioxane of about 15 parts by weight and less than about 20 parts by weight per 100 parts by weight of uncured epoxide resin are incorporated in the epoxide resin compositions of this invention, the tensile strength will tend to decrease from the maximum value to finally approximate the tensile strength of the original epoxide resin composition to which had been added no hydroxymethyl-dimethyl-meta-dioxane. Depending on the type of curing agent employed, when amounts of hydroxymethyl-dimethyl-meta-dioxane ranging between about 15 parts by weight and about 20 parts by weight per 100 parts by weight of uncured epoxide resin are incorporated into the epoxide resin compositions of this invention, the flexibility will either increase or decrease. As amounts of hydroxymethyl-dimethyl-metal-dioxane in excess of about 20 parts by weight per 100 parts by weight of uncured epoxide resin are incorporated in these novel epoxide resin compositions, the tensile strength will decrease, and in certain instances the flexibility will increase.

Thus it becomes apparent that by utilizing a hydroxymethyl-dimethyl-meta-dioxane in the preparation of epoxide resin compositions, one can now prepare epoxide resin compositions having specific physical properties for the purpose to which the epoxide resin is to be applied.

The properties exhibited by the epoxide resin compositions of this invention are unique and unexpected. It is well-known that diluents in general will degrade the physical properties of cured epoxide resin compositions. Diluents are useful, however, in regulating the viscosity of the epoxide resin to the particular application and to improve the wetting ability of adhesive and laminating formulations. Materials which are used conventionally to impart higher flexibility to a cured epoxide resin are classified into two types: the plasticizers and the flexibilizers. Plasticizers are defined as those materials which are non-reactive when combined with epoxide resins and may be considered as inert resinous or monomeric "fillers"; flexibilizers are those materials which react with the epoxide resin and become an integral part of the cured system. It is also well-known in the prior art that not only do plasticizers and flexibilizers tend to impart higher flexibility to cure epoxide resin compositions, they also in every instance tend to decrease the tensile strength of a cured expoxide resin composition.

The exact manner in which the hydroxymethyl-dialkyl-meta-dioxanes function in this invention is not fully understood, it is apparent, however, that the hydroxymethyl-dialkyl-meta-dioxanes do not merely act as a diluent since they do not degrade the physical properties of the epoxide resins, but rather enhance the physical properties of tensile strength and/or flexibility. Similarly, these materials could not merely be considered as plasticizers or flexibilizers, since upon incorportion of these materials into epoxide resin compositions, not only does the flexibility usually tend to increase, but also the tensile strength is markedly improved.

The instant invention will be further understood from the following examples which are intended as illustrative and should not be construed as limitative.

*Example I*

To 100 parts by weight of Epon 820 (manufactured and sold by the Shell Chemical Company) there were added 10 parts by weight of diethylenetriamine and the mixture was cured for 2 hours at 250° F. The cured epoxide resin composition had a tensile strength (as measured by ASTM Method D-638) of 6160 lbs./in.² and an elongation (as measured by ASTM Method D-638) of 6 percent.

Additional epoxide resin compositions were prepared using different uncured epoxide resins, various curing agents and varying amounts of 4,4-dimethyl-5-hydroxymethyl-meta-dioxane prepared by condensing isobutylene with formaldehyde in the presence of a sulfuric acid catalyst in the manner heretofore described. The resulting epoxide resin compositions and their physical properties are shown in Table II below.

Table II

| Experiment No. | Epoxide resin | | Curing agent | | HMDMDO,[2] pts. by weight | Cure schedule | Tensile strength,[1] lbs./in.² | Elongation,[1] percent |
|---|---|---|---|---|---|---|---|---|
| | Name | Pts. by weight | Type | Pts. by weight | | | | |
| 1 | Epon 820 | 100 | DETA [3] | 10 | 0 | 2 hrs. at 250° F | 6,160 | 6 |
| 2 | do | 100 | do | 10 | 5 | do | 10,800 | 15 |
| 3 | do | 100 | do | 10 | 10 | do | 12,000 | 14 |
| 4 | do | 100 | do | 10 | 15 | do | 11,500 | 9 |
| 5 | do | 100 | do | 10 | 20 | do | 10,700 | |
| 6 | do | 100 | do | 10 | 40 | do | 1,470 | 6 |
| 7 | do | 100 | Versamid [4] 140 | 75 | 0 | do | 7,530 | 34 |
| 8 | do | 100 | do | 75 | 5 | do | 8,170 | 99 |
| 9 | do | 100 | do | 75 | 15 | do | 7,920 | 37 |
| 10 | do | 100 | do | 75 | 20 | do | 6,940 | 17 |
| 11 | do | 100 | do | 75 | 40 | do | 3,410 | 17 |
| 12 | do | 100 | DBDA [5] | 35 | 0 | do | 6,520 | 2 |
| 13 | do | 100 | do | 35 | 5 | do | 7,500 | 7 |
| 14 | do | 100 | do | 35 | 15 | do | 7,000 | 9 |
| 15 | do | 100 | PA [6] | 40 | 0 | 8 hrs. at 320° F | 3,300 | |
| 16 | do | 100 | do | 40 | 20 | do | 7,800 | |
| 17 | do | 100 | do | 40 | 30 | do | 5,000 | |
| 18 | Epon 828 | 100 | DETA [3] | 15 | 0 | 2 hrs. at 250° F | 13,800 | 7 |
| 19 | do | 100 | do | 15 | 10 | do | 17,000 | 8 |
| 20 | do | 100 | do | 15 | 30 | do | 10,400 | 8 |
| 21 | Araldite 6005 | 100 | do | 15 | 0 | do | 14,000 | 7 |
| 22 | do | 100 | do | 15 | 10 | do | 16,800 | 8 |
| 23 | do | 100 | do | 15 | 30 | do | 10,500 | 8 |
| 24 | Araldite 6010 | 100 | do | 12 | 0 | do | 6,560 | 3 |
| 25 | do | 100 | do | 12 | 10 | do | 13,400 | 6 |
| 26 | do | 100 | do | 12 | 30 | do | 10,800 | 6 |
| 27 | ERL 2774 | 100 | do | 15 | 0 | do | 13,600 | 7 |
| 28 | do | 100 | do | 15 | 10 | do | 16,900 | 8 |
| 29 | do | 100 | do | 15 | 30 | do | 10,500 | 9 |
| 30 | Epi-Rez 510 | 100 | do | 15 | 0 | do | 14,000 | 6 |
| 31 | do | 100 | do | 15 | 10 | do | 17,000 | 8 |
| 32 | do | 100 | do | 15 | 30 | do | 10,400 | 9 |

[1] ASTM D-638.
[2] 4,4-dimethyl-5-hydroxymethyl-meta-dioxane.
[3] Diethylenetriamine.
[4] Liquid polyamide resin.
[5] Dodecylbenzene diamine.
[6] Phthalic anhydride.

It is clearly demonstrated by the data presented in Table II that superior epoxide resin compositions may be prepared by incorporating a hydroxymethyl-dialkyl-meta-dioxane therein. It is shown that by incorporating the proper amount of such a material into an uncured epoxide resin, and subsequently curing the entire mass, one can selectively produce epoxide resin compositions having greatly improved tensile strengths and/or improved flexibility characteristics. For example, in experiments 2, 8, 13 and 25 it is shown that the incorporation of hydroxymethyl-dimethyl-meta-dioxane in the epoxide resin increases both the tensile strength and the flexibility. In experiments 12, 13 and 14 it is shown that as the amount of hydroxymethyl-dimethyl-meta-dioxane is increased the tensile strength of the epoxide resin increases to a maximum and then tends to decrease whereas the flexibility continues to increase. This phenomenon is noted in several of the series of experiments reported above. In experiments 19, 22 and 28 it is shown that the incorporation of hydroxymethyl-dimethyl-meta-dioxane in the epoxide resin composition increases the tensile strength of the epoxide resin while the flexibility remains substantially the same. Thus, it is seen that "tailor-made" epoxide resins may be prepared in accordance with this invention whereby either the tensile strength or flexibility, or both, may be substantially increased.

Various changes and modifications in the products herein described may be made as will be apparent to those skilled in the art to which this invention pertains without departing from the spirit and intent of this invention.

It, therefore, is to be understood that the present invention is not to be limited except by the scope of the appended claims.

I claim:

1. A composition of matter prepared by mixing an epoxide resin having at least one vicinal epoxy group, an epoxide resin curing agent, and up to about 28 percent by weight of a hydroxymethyl-dimethyl-meta-dioxane and curing the resulting mixture.

2. A composition of matter prepared by mixing an epoxide resin having at least one vicinal epoxy group, an epoxide resin curing agent selected from the group consisting of aliphatic amines, aromatic diamines, condensation products of polymeric fatty acids and aliphatic polyamines, organic polybasic acids and organic acid anhydrides; and up to about 28 percent by weight of a hydroxymethyl-dimethyl-meta-dioxane, and curing the resulting mixture.

3. A composition of matter prepared by mixing an epoxide resin having at least one vicinal epoxy group, diethylene triamine, and up to about 28 percent by weight of a hydroxymethyl-dimethyl-meta-dioxane, and curing the resulting mixture.

4. A composition of matter prepared by mixing an epoxide resin having at least one vicinal epoxy group, dodecyl benzene diamine, and up to about 28 percent by weight of a hydroxymethyl-dimethyl-meta-dioxane, and curing the resulting mixture.

5. A composition of matter prepared by mixing an epoxide resin having at least one vicinal epoxy group, phthalic anhydride, and up to about 28 percent by weight of a hydroxymethyl-dimethyl-meta-dioxane, and curing the resulting mixture.

6. A composition of matter prepared by mixing an epoxide resin having at least one vicinal epoxy group, diethylene triamine, and up to about 28 percent by weight of 5-hydroxymethyl-4,4-dimethyl-meta-dioxane, and curing the resulting mixture.

7. A composition of matter prepared by mixing an epoxide resin having at least one vicinal epoxy group, dodecyl benzene diamine, and up to about 28 percent by weight of 5-hydroxymethyl-4,4-dimethyl-meta-dioxane, and curing the resulting mixture.

8. A composition of matter prepared by mixing an epoxide resin having at least one vicinal epoxy group, phthalic anhydride, and up to about 28 percent by weight of 5-hydroxymethyl-4,4-dimethyl-meta-dioxane, and curing the resulting mixture.

9. A composition of matter prepared by mixing an epoxide resin having at least one vicinal epoxy group, diethylene triamine, and up to about 28 percent by weight of 5-hydroxymethyl-4,5-dimethyl-meta-dioxane, and curing the resulting mixture.

10. A composition of matter prepared by mixing an epoxide resin having at least one vicinal epoxy group, dodecyl benzene diamine, and up to about 28 percent by weight of 5-hydroxymethyl-4,5-dimethyl-meta-dioxane, and curing the resulting mixture.

11. A composition of matter prepared by mixing an epoxide resin having at least one vicinal epoxy group, phthalic anhydride, and up to about 28 percent by weight of 5-hydroxymethyl-4,5-dimethyl-meta-dioxane, and curing the resulting mixture.

References Cited in the file of this patent

UNITED STATES PATENTS

| | | |
|---|---|---|
| 2,526,601 | Coes | Oct. 17, 1950 |
| 2,866,057 | Peck | Dec. 23, 1958 |
| 2,943,096 | Reinking | June 28, 1960 |

FOREIGN PATENTS

| | | |
|---|---|---|
| 496,233 | Great Britain | Nov. 28, 1938 |
| 117,677 | Russia | May 19, 1958 |

OTHER REFERENCES

Hackh's Chemical Dictionary, 3rd ed., 1944, publ. by McGraw-Hill Book Co. (page 310 relied on).